(12) United States Patent
Downie

(10) Patent No.: US 11,440,023 B2
(45) Date of Patent: Sep. 13, 2022

(54) MODULAR MAGNETIC ASSEMBLY

(71) Applicant: ADEY HOLDINGS (2008) LIMITED, Cheltenham (GB)

(72) Inventor: Simon Downie, Cheltenham (GB)

(73) Assignee: ADEY HOLDINGS (2008) LIMITED, Cheltenham (GB)

( * ) Notice: Subject to any disclaimer, the term of this patent is extended or adjusted under 35 U.S.C. 154(b) by 0 days.

(21) Appl. No.: 16/493,852

(22) PCT Filed: Feb. 21, 2018

(86) PCT No.: PCT/EP2018/054230
§ 371 (c)(1),
(2) Date: Sep. 13, 2019

(87) PCT Pub. No.: WO2018/166769
PCT Pub. Date: Sep. 20, 2018

(65) Prior Publication Data
US 2020/0078797 A1 Mar. 12, 2020

(30) Foreign Application Priority Data

Mar. 14, 2017 (GB) ..................... 1704015

(51) Int. Cl.
| | | |
|---|---|---|
| B03C 1/033 | (2006.01) | |
| B03C 1/28 | (2006.01) | |
| C02F 1/48 | (2006.01) | |

(52) U.S. Cl.
CPC ............ B03C 1/0332 (2013.01); B03C 1/288 (2013.01); C02F 1/482 (2013.01); B03C 2201/18 (2013.01); B03C 2201/28 (2013.01)

(58) Field of Classification Search
CPC ......... B03C 1/0332; B03C 1/288; B03C 1/28; B03C 2201/18; B03C 2201/28; C02F 1/482
See application file for complete search history.

(56) References Cited

U.S. PATENT DOCUMENTS 2,800,230 A * 7/1957 Thoma ...................... B03C 1/28
  210/223
5,269,916 A * 12/1993 Clair ........................ C02F 1/482
  210/222

(Continued)

FOREIGN PATENT DOCUMENTS

| CN | 103920583 B | 8/2016 |
|---|---|---|
| DE | 20010223 U1 | 8/2000 |

(Continued)

OTHER PUBLICATIONS

Liu (DE 202005015060) machine translation and original attached (Year: 2005).*

*Primary Examiner* — Liam Royce
(74) *Attorney, Agent, or Firm* — Jacob M. Ward; Ward Law Office LLC

(57) ABSTRACT

A magnetic filter (10) for a central heating system comprises a filter body (12) and an external magnetic assembly (18). The magnetic assembly is in the form of a belt which is made up of multiple modules. The modules may be identical to each other. The number of modules in the belt can be selected according to the size of the filter body, allowing various different sizes of filter to be produced from a small number of different parts. The filter body may be the body of an air-and-dirt separator, so that an existing air-and-dirt separator can be upgraded to include a magnetic capturing capability.

15 Claims, 6 Drawing Sheets

(56) References Cited

U.S. PATENT DOCUMENTS

| | | |
|---|---|---|
| 5,273,648 A | 12/1993 | Caiozza |
| 5,714,063 A | 2/1998 | Brunsting |
| 5,932,108 A | 8/1999 | Brunsting |
| 6,077,333 A * | 6/2000 | Wolfs .................. B03C 1/0332 96/1 |
| 2006/0037902 A1 | 2/2006 | Pedersen |
| 2014/0263077 A1 | 9/2014 | Lombardi et al. |

FOREIGN PATENT DOCUMENTS

| | | |
|---|---|---|
| DE | 202005015060 U1 | 12/2005 |
| JP | 2001179263 A | 7/2001 |
| JP | 2004017022 A | 1/2004 |

* cited by examiner

MODULAR MAGNETIC ASSEMBLY

CROSS-REFERENCE TO RELATED APPLICATIONS

This patent application is a United States National Stage of International Patent Application No. PCT/EP2018/054230, filed Feb. 21, 2018, which in turn claims the benefit of Great Britain Patent Application No. GB1704015.5, filed Mar. 14, 2017. The entire disclosures of the above patent applications are hereby incorporated herein by reference.

FIELD OF THE INVENTION

The present invention relates to a modular magnetic assembly, in particular to a modular belt-like device which can be fitted around outer surfaces of filter housings of differing circumference.

BACKGROUND TO THE INVENTION

It is well known to provide magnetic filters in wet central heating systems, to remove magnetic particles which have become entrained in the flow of central heating system water. A magnetic filter typically comprises a housing with an inlet and an outlet, connected into a central heating system circuit so that central heating system water flows through the housing. A magnet is provided within the housing, to attract and retain any magnetic contamination which may be present in the water. From time to time, the magnetic filter is serviced to remove trapped magnetic contamination.

Another type of known magnetic filter includes a housing through which central heating system water flows, and a magnet on the outside of the housing, so that magnetic contaminants are retained against an inside surface of the walls of the housing. This type of filter can be cleaned by isolating the filter from the central heating system circuit by closing valves, removing the externally-mounted magnet, and then opening a drain port to flush dirt out of the filter. To improve cleaning, one of the valves to the central heating system circuit can be opened to use the pressure of the central heating system to thoroughly flush out debris. One problem with this type of filter is that good performance relies on the magnets being held tightly against the outer surface of the housing. Usually, the outer surface of the housing is curved, and this presents a particular problem with accurately positioning an external magnetic element. Tolerances in the manufacture of the housing mean that even a custom-designed external magnet assembly, which is supposed to exactly match the external profile of the filter housing, may not in fact fit completely up against the outer surface of the housing. Also, the need to create a range of filters for various different sized heating systems requires custom matching parts in each different size, driving up the cost of this type of filter.

Larger heating systems (typically in commercial buildings) often include an 'air and dirt separator'. This type of device is primarily intended to continually remove any entrained air from the central heating system water, but often also includes some means for removing solid particles, for example a basket sieve. However, these devices are not usually effective to remove magnetic debris, in particular because magnetic particles are too small to be caught in a mesh or sieve filter without making the mesh so fine that the device would clog quickly.

It is an object of the invention to provide the means for producing magnetic filters of the type where a magnet is provided on the outside of the housing, realising high performance and efficiency of production over a range of filters suited to different-sized heating systems. It is a further object of the invention to provide the means to retrofit a magnetic capturing capability to an air and dirt separator, or to other existing devices installed in a central heating system circuit.

STATEMENT OF INVENTION

According to the present invention, there is provided a modular magnetic belt assembly for fitting around the external surface of a filter housing, the magnetic belt assembly comprising a plurality of modules, each module including at least one magnet, the modules being connected to each other to form the belt and each module being hinged to its adjacent module(s), and a means of joining the ends of the modular magnetic belt to each other to form an endless loop for fitting around the external surface of the filter housing, the magnet of each module being movable between an in-use position for the magnet to contact the external surface of the filter housing, and an out-of-use position for holding the magnet in a position spaced from the external surface of the filter housing, when the magnetic belt assembly is fitted around the external surface of the filter housing.

The magnetic belt assembly, when placed around a filter housing, creates a magnetic filter. Because the assembly is modular, a longer or shorter belt can be produced simply by using more or fewer modules. Therefore, magnetic filters of various different sizes can be made, without the need to manufacture large numbers of custom-moulded parts. Furthermore, any suitable vessel which is already connected into a central heating system circuit, for example a water and dirt separator, can effectively be upgraded to include a magnetic capture capability, simply by installing a magnetic belt assembly around the outside surface of the existing vessel. If the vessel to be upgraded is not already fitted with suitable valves and a drain port, these can easily be fitted on the inlet and outlet, where the vessel connects into the heating circuit, to allow the filter to be cleaned.

The filter body may be a purpose designed filter body. An example embodiment is made from stainless steel, and is substantially in the form of a cylindrical pipe. The diameter of the pipe, where it forms part of the filter, is ideally greater than the diameter of the central heating system circuit pipework. This allows magnetic debris to collect on the interior surface of the filter, without creating a flow restriction.

The modules are hinged to each other, that is they are articulated to each other so that they can pivot with respect to each other. This allows the belt to fit over different curvatures for different sizes of vessel. Although in most cases it is envisaged that the vessel will be substantially cylindrical with a curved surface, it is possible for the belt to be sufficiently flexible to pass around sharp corners, and so the filter body could be (for example) octagonal or even square in cross section. The hinge may be in the form of a pin and a sleeve, or may take any other form. For example, a very flexible hinge could be made by using a strip of flexible webbing between modules.

The modules are connected to each other substantially in a row. When wrapped around the filter body, the ends of the row are joined to each other. Preferably, the joining means also include adjustable tightening means, to compensate for the discrete choice of lengths of belt which are possible due to the need to assemble a belt from an integer number of modules. The joining means could be, for example, a buckle similar to that used on a ski boot.

Because of the advantage of providing tightening means, it is envisaged that in most embodiments the joining (and tightening) means will be provided by a separate component, or possibly a pair of components, which is/are attached to end(s) of the assembled belt. However, by designing the modules in a suitable way, it may be possible to incorporate joining means into the modules, so that the belt can be assembled from multiple modules, wrapped around the filter body, and then the modules at the ends of the belt joined directly to each other. One way of doing this may be to provide adjustable tightening means on each module, for adjusting the spacing between adjacent modules. Each individual tightening means may require only a small amount of adjustability. The belt would be assembled with all of the tightening means on a loose setting, wrapped loosely around the outer surface of the filter body, and the modules at the ends of the belt joined directly together. The tightening means of each module can then be incrementally tightened, drawing the modules towards each other along the belt and around the filter body, to tighten the endless belt around the filter body and thereby retain it in place.

The magnet in each module is movable between an in-use position in contact with the filter body, and an out-of-use position spaced from the filter body. This allows the magnetic filter to be cleaned without removing the belt from the filter body. To clean the filter, first it is isolated from the central heating system circuit, for example by closing valves. Then, each magnet is moved to the out-of-use position. This releases magnetic particles which will have been attracted out of the central heating system water and collected and retained on the inside surface of the filter body. A drain port can then be opened to drain the contents of the filter. Preferably, the filter is flushed through by opening one of the valves and allowing pressurised water from the central heating system circuit to rush through the filter and out of the drain, carrying the loose magnetic particles with it. When cleaning is complete, the drain port is closed, the filter is reconnected to the central heating system circuit, and the magnets are moved back into the in-use position.

Preferably, a mechanism is provided for moving the magnet of each module, which provides a mechanical advantage at least when moving the magnet out of the in-use position into the out-of-use position. When the filter has been in operation for some time and magnetic particles have accumulated on the inside surface of the filter body, there will be significant magnetic attraction between the magnetic particles and the magnet of each module, pulling the magnet of each module towards the surface of the filter body. In order to easily move the magnet into the out-of-use position, some mechanical advantage is required. For example, the magnet may be mounted on a screw-threaded shaft. In one embodiment, the magnet is mounted on a carrier having an internally screw-threaded aperture, and an externally screw-threaded shaft is connected to an operating handle, so that when the operating handle is turned to screw the externally-threaded shaft into the internally-threaded aperture, the magnet is drawn towards the handle, and away from the filter body. When the operating handle is turned to unscrew the threaded shaft out of the threaded hole, the magnet will move away from the handle, towards the filter body. Preferably, a spring is provided to urge the magnet towards the filter body, so that when the magnet is moved away from the body, the action of the screw thread is acting against the spring.

At least one magnet is provided in each module. Preferably, two magnetic billets are provided, joined by a ferromagnetic (i.e. having high susceptibility to magnetization) carrier. The ferromagnetic carrier may be made from mild steel. In effect this produces a 'horseshoe' magnet, with north and south poles which are directed parallel to each other, against the external surface of the filter body in the in-use position. Modules may be produced which have north and south poles in alternating positions, i.e. a belt could be assembled from 'A' modules and 'B' modules in the pattern ABABABA etc., so that any two adjacent magnetic poles, either between modules or within modules, are opposite poles. It is envisaged that the two magnetic billets in each module may be disposed along a line which runs substantially perpendicular to a line along/around the belt, although other arrangements are possible.

Preferably, the magnet or magnetic element or each module may be mounted to the module on a pivotable bearing, preferably being pivotable substantially at the centre of the magnet or magnetic element, in all directions. In one embodiment, the pivot is provided between the operating handle and the body of the module. Alternatively, a pivot may be provided on the ferromagnetic carrier which joins two magnetic billets. The pivotable bearing ensures that the magnetic poles can contact the outside surface of the filter body as closely as possible, even if the modules are slightly off-line, or if the surface of the filter body is imperfect.

Preferably, the hinge between adjacent modules is substantially in the form of a pin on one side of each module, and a barrel on the other side of each module. The pin of each module can be placed into the barrel of its adjacent module. The hinge ideally allows for enough pivoting to allow use of the same modules to form different lengths of belt for use with filter bodies of different sizes. In some embodiments it may be desirable to make the hinged joints as flexible as possible, for example to accommodate sharp corners or irregular shapes on the filter body. However, since most of the time it is envisaged that filter bodies will be close to cylindrical, in a preferred embodiment the hinged joint is restricted in flexibility, for example to allow pivoting between modules of no more than 90 degrees, 60 degrees, 45 degrees or 30 degrees in different variants. Restricting the range of movement makes the belt easier to handle during assembly and fitting, bearing in mind that the modules contain strong magnets which will interact with each other. If unrestricted movement is allowed between modules then extreme care must be taken to avoid modules snapping together, which may cause damage or even injury.

According to a second aspect of the invention, there is provided a method of making a magnetic filter having a filter body for connection into a central heating system circuit, and an external magnetic assembly, the method comprising the steps of:

assembling a modular magnetic belt from a plurality of modules, each module having a magnet, the modules of the belt being connected to each other and each module being hinged to its adjacent module(s), the number of modules in the belt being selected according to the length of a path around an external surface of the filter body;

wrapping the magnetic belt around an external surface of the filter body; and joining the ends of the belt to each other to form an endless loop which is fixed in place around the external surface of the filter housing.

Preferable/optional features of the second aspect of the invention are set out in claims 21 to 24.

DESCRIPTION OF THE DRAWINGS

For a better understanding of the present invention and to show more clearly how it may be carried into effect, example embodiments will now be described with reference to the accompanying drawings, in which.

DESCRIPTION OF PREFERRED EMBODIMENT

Figure 1:
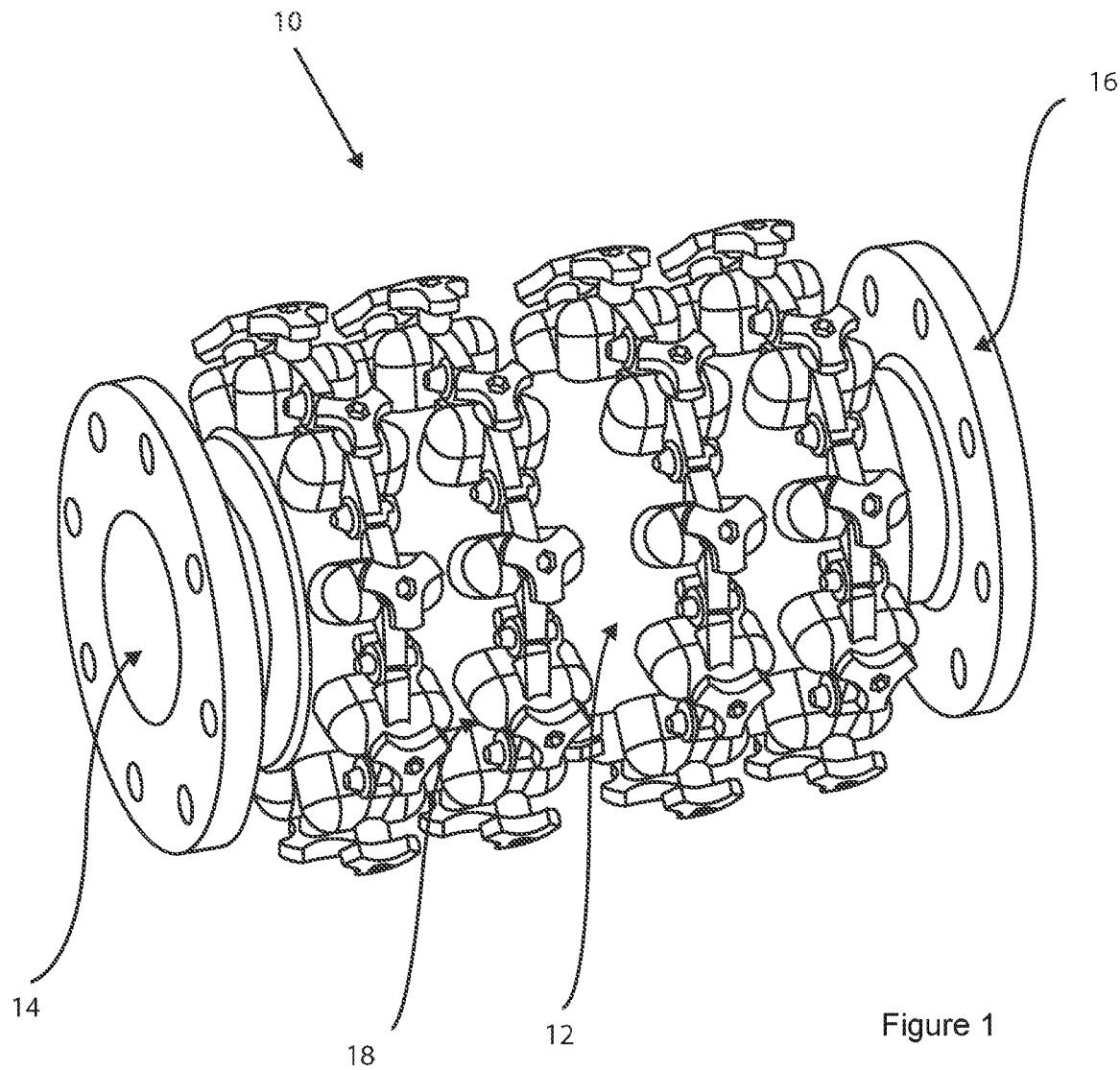
FIG. 1 is a perspective view of a magnetic filter including a modular magnetic belt according to the invention.

Referring firstly to FIG. 1, a magnetic filter for a central heating system is indicated generally at 10. The magnetic filter comprises a filter body 12, which is in the form of a substantially cylindrical section of stainless steel pipe. Inlet and outlet ports 14, 16 are provided for connection into a central heating system circuit. Flanges surround the inlet and outlet ports 14, 16, for fixing the magnetic filter 10 to similar flanges on central heating system pipework. The magnetic filter 10 may be produced in various different sizes, for fitting to central heating system pipework having a diameter from around 2 inches (50 mm) upwards.

This particular embodiment does not include any valves or a drain port, but these can be interposed between the filter body 12 and the central heating system pipework, using off-the-shelf valve and drain components.

This embodiment is designed for fixing to 2 inch (50 mm) pipework, the bore diameter at the inlet and outlet 14, 16 is therefore nominally 2 inches/50 mm. However, a major extent of the filter body 12 has an enlarged diameter, for example of 3 inches/75 mm. This allows for magnetic debris to be attracted and retained against the internal walls of the filter body 12, without causing a restriction in the central heating system circuit.

Modular magnetic belts 18 are wrapped around the filter body 12. In this embodiment, four identical belts 18 are provided. Each belt is constructed of multiple modules, and each is joined together to create an endless loop around the filter body 12.

Figure 2:
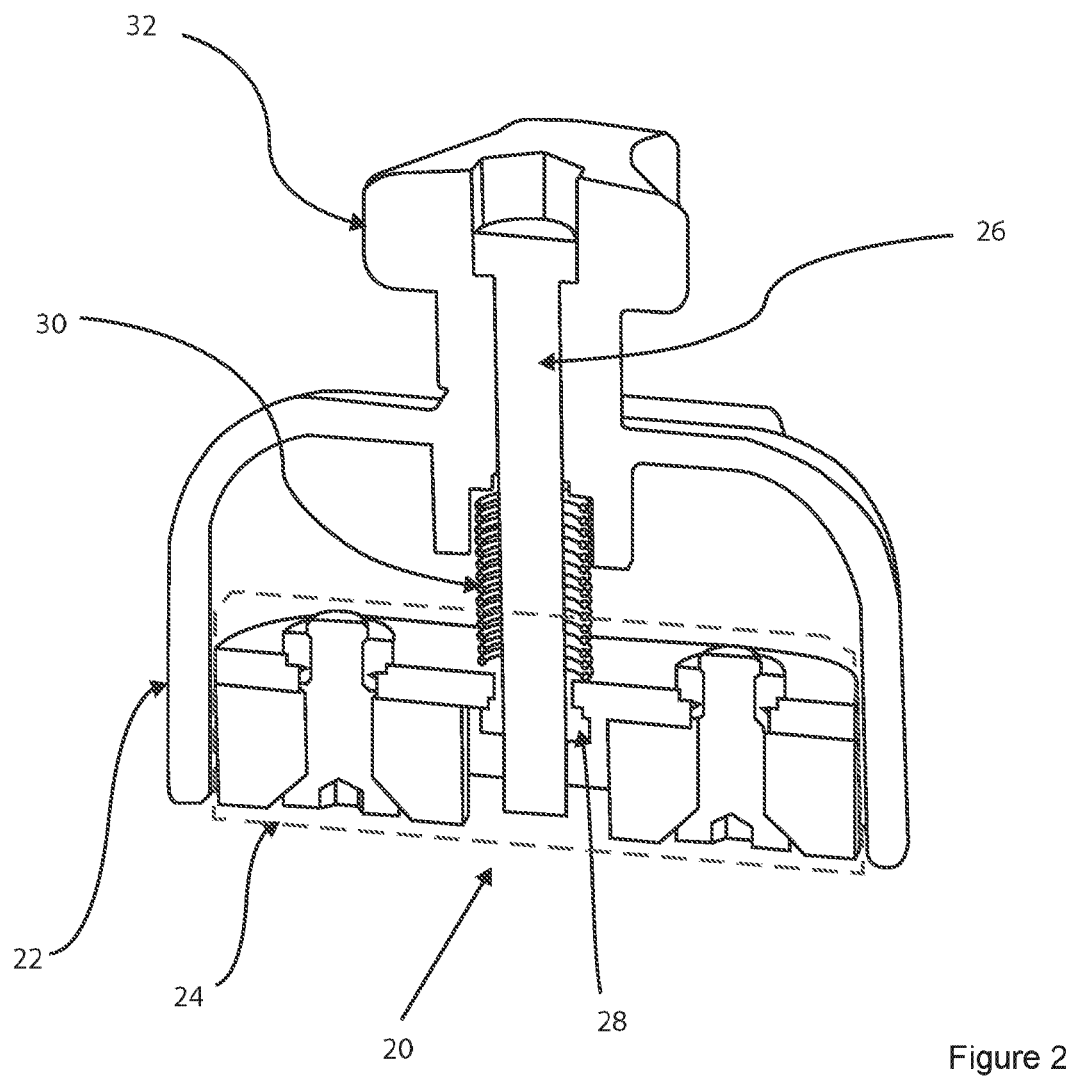
FIG. 2 is a cross section of a module, part of the magnetic belt in the filter of FIG. 1.

The individual modules 20 will now be described in more detail with reference to FIG. 2. Each module has a housing 22. In this embodiment the housing 22 is made from plastics. A magnetic element 24 is movable within the housing 22, from an in-use position in which the magnetic element 24 is in contact with the external surface of the filter body (12) (it is the in-use position which is shown in FIG. 2), to an out-of-use position in which the magnetic element 24 is spaced from the external surface of the filter body (12). The out-of-use position is not illustrated in the drawings, but with reference to FIG. 2, the magnetic element 24 would be further towards the top of the drawing in the out-of-use position, rather than level with the bottom edge of the housing 22. The magnetic element is movable by means of an externally screw-threaded shaft 26 which passes through and engages an internally screw-threaded aperture 28 in the magnetic element 24. A spring 30 urges the magnetic element 24 towards the filter body (12) (i.e. downwards in FIG. 2). The screw-threaded shaft 26 is fixed to and operated by a handle 32. The screw-threaded shaft 26 is a conventional right-hand screw, so when the handle 32 is turned clockwise, the magnetic element 24 is drawn away from the filter body (12), against the action of the spring 30 and also against any magnetic attraction between the magnetic element 24 and the filter body (12) or magnetic debris retained on the internal wall of the filter body (12).

The side of the handle 32 where it meets the module body 22 (i.e. the lower side of the handle 32 in FIG. 2) preferably has a convex surface. This results in a pivoting bearing about which all components inside the module 20 can move. This allows the magnetic element 24 to make good contact with the outside surface of the filter body (12), irrespective of the shape or curvature of the filter body, or of any imperfections/irregularities on the surface.

Figure 3:
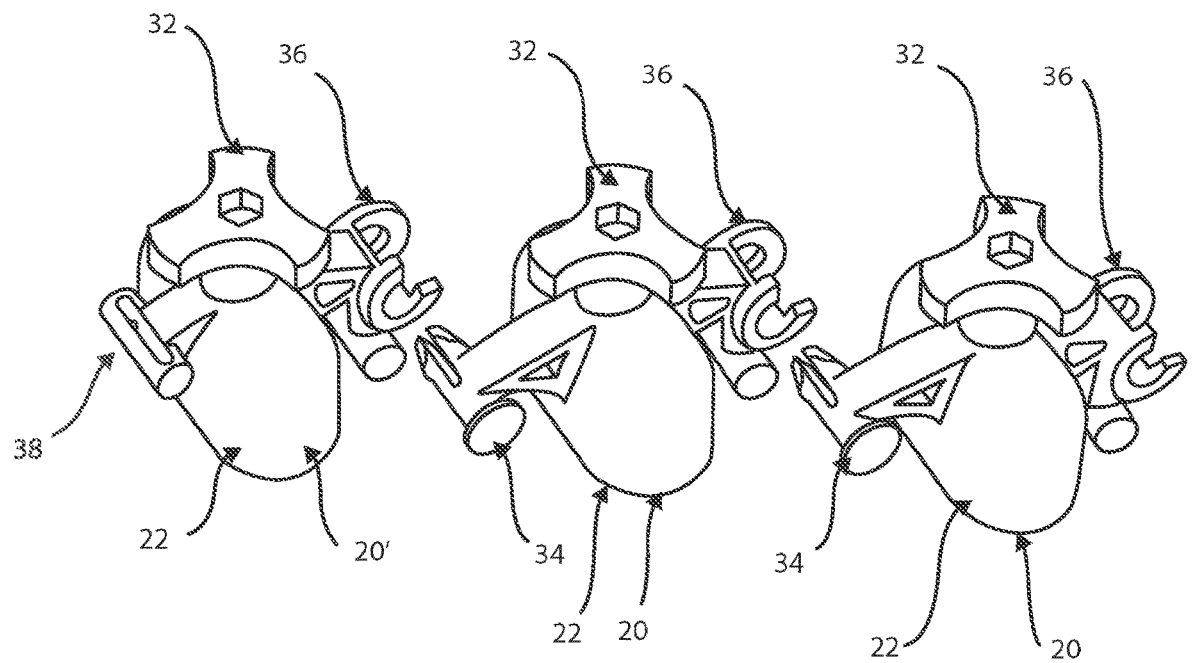
FIG. 3 is a perspective view of several of the modules of FIG. 2, detached from each other.

Referring now to FIG. 3, a row of three modules 20, 20' is shown. In this embodiment, the modules 20 are entirely identical to each other, and each one includes a hinge pin 34 on one side of the module body 22, and a hinge barrel 36 on the other side. The module 20' on the far left of FIG. 3 is slightly different, in that a slotted pin 38 is provided in place of the hinge pin. This module is designed to go at one end of a belt, formed with one module 20' at an end, multiple modules 20 in the middle, and then another end module (not illustrated) which has a slotted pin similar to the slotted pin 38, but in place of the hinge barrel 36.

The hinge pins 34 slot into the hinge barrels 36 to make articulated joints between adjacent modules. In this embodiment, the hinge barrel is designed to allow only around 90 degrees of rotation in the hinge, to allow enough flexibility to use assembled belts on a variety of different diameter filter bodies, but to prevent unwanted snapping of modules against each other when the belt is detached.

Figure 6:
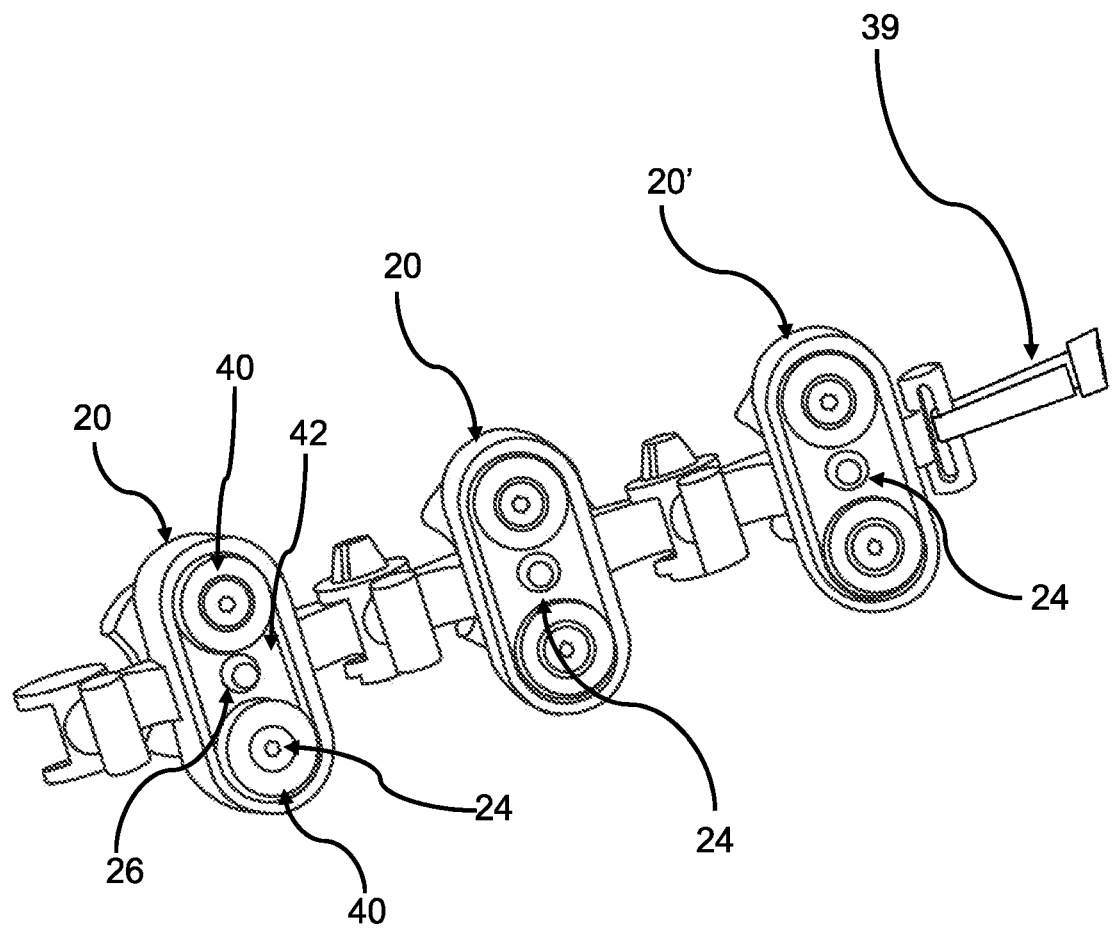
FIG. 6 shows a perspective view of another embodiment of the magnetic belt shown in FIG. 3.

In a simple embodiment, the modules at either end of the belt, which have the slotted pin 38, may be joined to each other for example with a cable tie, which allows the belt to be tightened around the filter body. In other embodiments, such as that shown in FIG. 6, a buckle or similar 39 may be provided for joining the ends together, or alternatively all modules could be identical, each one having a small amount of adjustability to tighten the belt of modules around the filter body.

Figure 4:
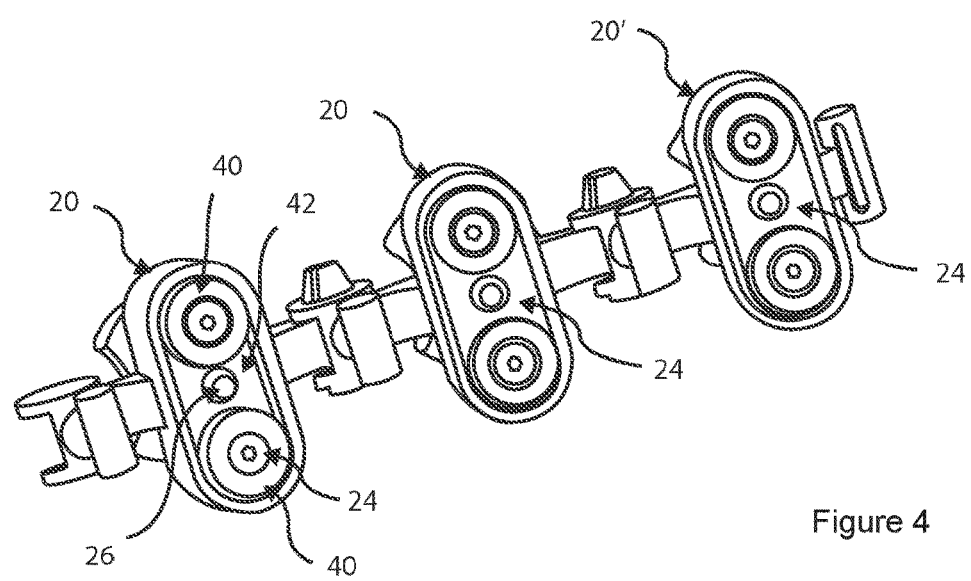
FIG. 4 shows a perspective view from another angle of the modules of FIG. 3, attached to each other.

FIG. 4 shows the underside of the modules 20, 20', when attached and in a row to form part of a belt. The side of the magnetic assembly 24 which would in use be against the external surface of the filter body is visible in this figure. Each magnetic assembly includes two magnetic billets 40, attached to a ferromagnetic (mild steel) carrier 42. In the figure, the topmost billet of each magnetic assembly is oriented with its north pole facing towards the filter body (i.e. out of the page in FIG. 4), and the lower billet of each magnetic assembly 24 is oriented with its south pole facing the filter body. Each magnetic assembly 24 is in effect a horseshoe magnet, with the north pole towards the top of the drawing.

In this embodiment, the polarity of the magnetic assemblies is the same in each module 20, 20'. However, in some embodiments the polarity may alternate. This would mean providing an 'A' type module and a 'B' type module with the modules alternating ABABABA etc. along the belt. In this case, the 'A' type module could have (for example) two hinge pins 34, and the 'B' type module could have two hinge barrels 36. In this way, the modules can only be connected together in a way which alternates the polarities.

Figure 5:
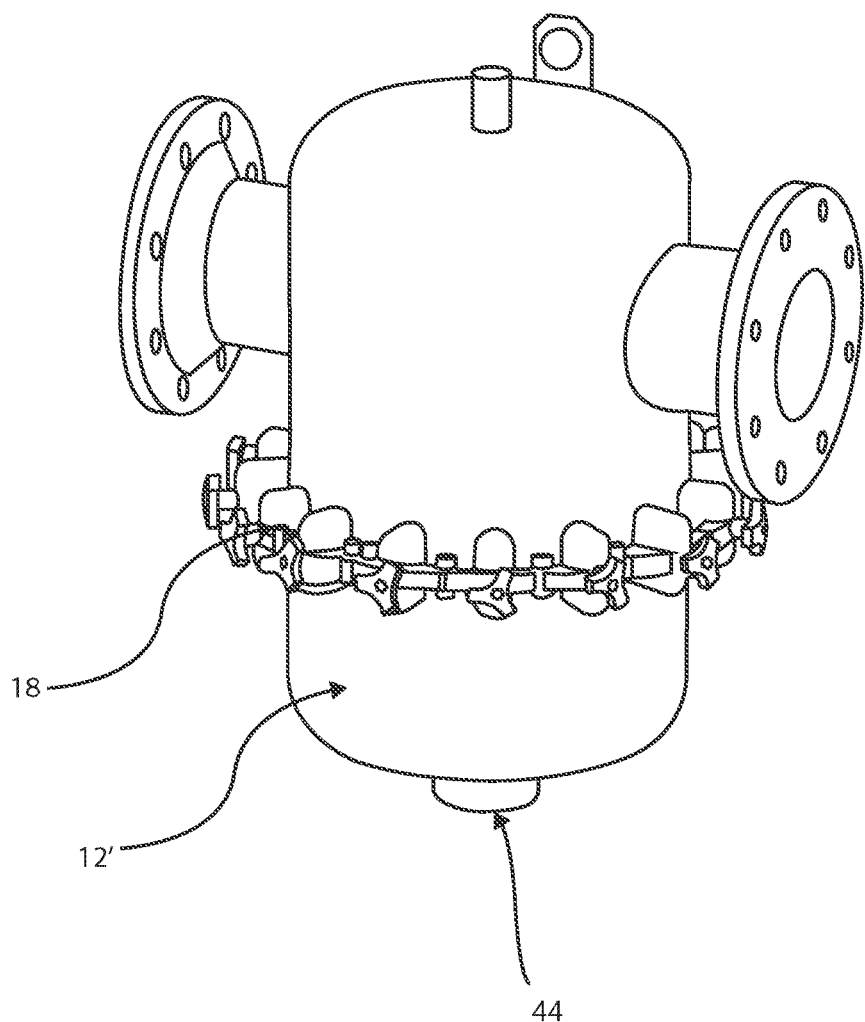
FIG. 5 shows an alternative embodiment of a magnetic filter, in the form of an air and dirt separator fitted with a modular magnetic belt according to the invention.

FIG. 5 shows an alternative embodiment of a magnetic filter, in that the filter body 12' is the body of an air and dirt separator of known design. The air and dirt separator may already be present in the system, and is likely to already be fitted with isolating valves. A drain port 44 is provided already as part of the air and dirt separator. The air and dirt separator can therefore be upgraded to add magnetic capturing capability, simply by installing a modular magnetic belt 18 according to the invention around the circumference of the air and dirt separator. Because the belt is modular, belts can be assembled to fit a wide variety of air and dirt separators, including those suited for different sized heating systems and including a wide variety of different makes and models of air and dirt separator. Preferably, several belts may be installed for enhanced magnetic capture.

The modular magnetic belt of the invention allows for a low-cost and straightforward magnetic filter suitable for commercial sized heating systems, for example with a bore of around 2 inches (50 mm) or greater. Filters can be made in many different sizes, the whole range of products only requiring a small number of different parts, since the modules in each case are identical, only the number of modules joined together in a belt will differ. Kits can be provided for upgrading air and dirt separators to include a magnetic capture capability.

Figure 7:
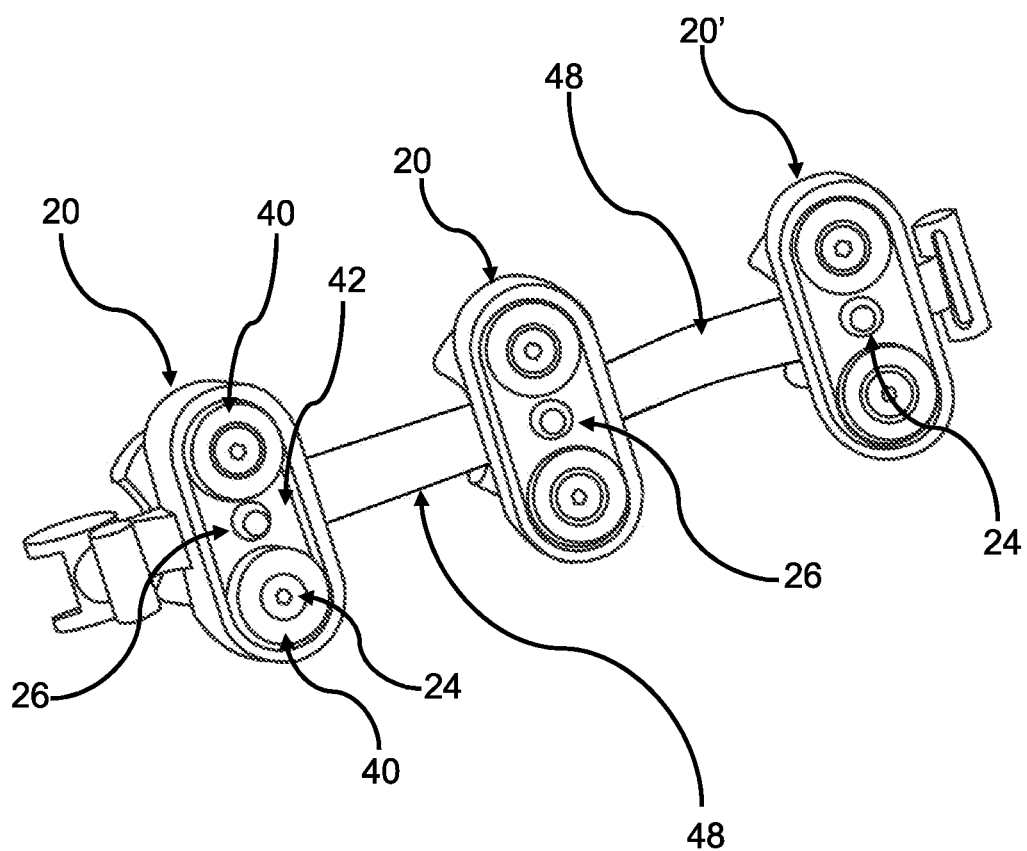
FIG. 7 shows a perspective view of another embodiment of the magnetic belt.

FIG. 7 shows a further embodiment of the flexible belt. This embodiment has similar features to the embodiment's discussed above with the main difference being the hinged connection. As shown in FIG. 7, each of modules 20, 20' are connected together by a strip of flexible webbing 48. The flexible webbing 48 acts as a flexible hinge between each module 20, 20'.

It will be apparent that modifications may be made to the embodiments described, which are only examples of how the invention may be put into effect. The invention is defined in the claims.

The invention claimed is:

1. A modular magnetic belt assembly comprising:
    the modular magnetic belt assembly configured for use with a filter housing having an external surface;
    a plurality of modules, each module including a housing and at least one magnet, the modules being connected to each other to form the belt and each module being hinged to its adjacent modules;
    a joining component attached to an end of the assembled belt, the joining component joining the ends of the magnetic belt to each other to form an endless loop for fitting around the external surface of the filter housing, the magnet of each module being movable relative to the module housing and within the module housing between an in-use position for the magnet to contact the external surface of the filter housing and an out-of-use position within the module housing for holding the magnet in a position spaced from the external surface of the filter housing, when the magnetic belt assembly is fitted around the external surface of the filter housing.

2. The modular magnetic belt assembly of claim 1, in which each module is hinged to its adjacent modules by means of a hinged connection, the hinged connection between modules being in the form of a pin and a sleeve.

3. The modular magnetic belt assembly of claim 1, in which each module is hinged to its adjacent modules by means of a hinged connection, the hinged connection between modules including a strip of flexible webbing between modules.

4. The modular magnetic belt assembly of claim 1, in which the joining component includes an adjustable tightener for tightening the magnetic belt around the filter body.

5. The modular magnetic belt assembly of claim 1, in which the joining component is incorporated into each module, the modules at the ends of the belt being joined directly to each other.

6. The modular magnetic belt assembly of claim 1, in which a magnet mover is provided for moving the magnet of each module, the magnet mover having a mechanism providing a mechanical advantage of greater than one at least when moving the magnet from the in-use position to the out-of-use position.

7. The modular magnetic belt assembly of claim 6, in which the mechanism includes a screw thread and a screw-threaded shaft connected to a handle, the magnet being connected to the screw-threaded shaft.

8. The modular magnetic belt assembly of claim 6, in which the mechanism is manually operable with an operating handle.

9. The modular magnetic belt assembly of claim 1, in which a first magnet and a second magnet are provided in each module, the first magnet and the second magnet each being mounted to a ferromagnetic carrier.

10. The modular magnetic belt assembly of claim 9, in which the north pole of the first magnet faces the filter housing, and the south pole of the second magnet faces the filter housing when the first magnet and the second magnet are in the in-use position.

11. The modular magnetic belt assembly of claim 10, in which a first type of modules and a second type of modules are provided, the first type of modules having the north pole of the first magnet and the south pole of the second magnet facing the filter housing in the in-use position, and the second type of modules having the south pole of the first magnet and the north pole of the second magnet facing the filter housing in the in-use position, such that the first magnet and the second magnet of the first type of modules are positioned in an opposite orientation relative to the first magnet and the second magnet of the second type of modules.

12. The modular magnetic belt assembly of claim 11, in which the first type of modules and the second type of modules are disposed alternately along the length of the assembled belt.

13. A magnetic filter for a central heating system comprising:
    a modular magnetic belt assembly configured for use with a filter housing having an external surface;
    the modular magnetic belt assembly having a plurality of modules, each module including a housing and at least one magnet, the modules being connected to each other to form the belt and each module being hinged to its adjacent modules;
    a joining component attached to the end of the assembled belt, the joining component joining the ends of the magnetic belt to each other to form an endless loop for fitting around the external surface of the filter housing, the magnet of each module being movable relative to the module housing and within the module housing between an in-use position for the magnet to contact the external surface of the filter housing and an out-of-use position within the module housing for holding the magnet in a position spaced from the external surface of the filter housing, when the magnetic belt assembly is fitted around the external surface of the filter housing; and a filter housing, in which the magnetic belt assembly is disposed around the filter housing, the magnets of each module being in contact with an external surface of the filter housing in an in-use position and being spaced from the external surface of the filter housing in an out-of-use position.

14. The magnetic filter of claim 13, in which the filter housing is in the form of a cylindrical pipe.

15. The magnetic filter of claim 13, in which the filter housing is a body of an air-and-dirt separator.

* * * * *